US012806866B2

(12) United States Patent
Keefe et al.

(10) Patent No.: US 12,806,866 B2
(45) Date of Patent: Nov. 24, 2026

(54) COMPOSITE RADIUS FILLERS, ASSEMBLIES INCLUDING COMPOSITE RADIUS FILLERS, AND SYSTEMS AND METHODS OF FORMING THE SAME

(71) Applicant: The Boeing Company, Arlington, VA (US)

(72) Inventors: Bonnie A. Keefe, Everett, WA (US); James T. Nguyen, Seattle, WA (US); Christopher J. Deatrick, Everett, WA (US); Erik A Phillips, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 71 days.

(21) Appl. No.: 18/680,914

(22) Filed: May 31, 2024

(65) Prior Publication Data

US 2025/0367888 A1 Dec. 4, 2025

(51) Int. Cl.
*B29C 65/00* (2006.01)
*B29L 31/30* (2006.01)
*B64C 3/26* (2006.01)

(52) U.S. Cl.
CPC ...... *B29C 66/301* (2013.01); *B29C 66/30341* (2013.01); *B29C 66/721* (2013.01); *B64C 3/26* (2013.01); *B29L 2031/3085* (2013.01)

(58) Field of Classification Search
None
See application file for complete search history.

(56) References Cited

U.S. PATENT DOCUMENTS 4,113,910 A 9/1978 Loyd
4,331,723 A 5/1982 Hamm
(Continued)

FOREIGN PATENT DOCUMENTS

CN 101959674 A 1/2011
EP 2610165 A1 7/2013
(Continued)

OTHER PUBLICATIONS

European Patent Office, Extended European Search Report issued in related application EP25179443, Sep. 23, 2025.
(Continued)

*Primary Examiner* — Magdalena Topolski
(74) *Attorney, Agent, or Firm* — Kolitch Romano Dascenzo Gates LLP

(57) ABSTRACT

An example of a composite radius filler or an assembly comprising a composite radius filler comprises a body having a longitudinal axis. The body comprises a main-portion and an end-portion. The main-portion extends along the longitudinal axis and has a first stiffness. The body further comprises an end-portion that extends along the longitudinal axis, that is adjacent to the main-portion, that defines at least a portion of a terminal end of the body, and that has a second stiffness that differs from the first stiffness. At least a first portion of an interface between the main-portion and the end-portion is at an angle relative to the longitudinal axis. Methods for a composite manufacturing method comprise constructing a composite radius filler. Aircraft assemblies comprising a composite radius filler are further disclosed.

20 Claims, 9 Drawing Sheets

(56) References Cited

U.S. PATENT DOCUMENTS

| | | | | |
|---|---|---|---|---|
| 4,440,593 | A | 4/1984 | Goldsworthy | |
| 4,559,005 | A | 12/1985 | Gants et al. | |
| 4,789,594 | A | 12/1988 | Stawski | |
| 4,919,739 | A | 4/1990 | Dyksterhouse et al. | |
| 5,026,447 | A | 6/1991 | O'Connor | |
| 5,192,383 | A | 3/1993 | Cavin | |
| 5,268,050 | A | 12/1993 | Azari | |
| 5,556,496 | A | 9/1996 | Sumerak | |
| 5,639,535 | A | 6/1997 | McCarville | |
| 5,948,472 | A | 9/1999 | Lawrie | |
| 6,500,370 | B1 | 12/2002 | Belvin et al. | |
| 6,562,436 | B2 | 5/2003 | George et al. | |
| 6,689,448 | B2 | 2/2004 | George et al. | |
| 6,709,538 | B2 | 3/2004 | George et al. | |
| 6,800,164 | B2 | 10/2004 | Brandstrom | |
| 7,534,319 | B2 | 5/2009 | Mead et al. | |
| 7,987,885 | B2 | 8/2011 | Zhou et al. | |
| 8,101,107 | B2 | 1/2012 | Brown et al. | |
| 8,211,530 | B2 | 7/2012 | Mead et al. | |
| 8,591,685 | B2 | 11/2013 | Anderson et al. | |
| 8,815,036 | B2 | 8/2014 | Nitsch | |
| 8,864,074 | B2 * | 10/2014 | Flood | B64C 3/26 244/119 |
| 9,073,272 | B2 | 7/2015 | Blot et al. | |
| 9,327,470 | B1 * | 5/2016 | Krajca | B29D 99/0005 |
| 9,463,864 | B1 | 10/2016 | McCarville et al. | |
| 9,566,739 | B2 * | 2/2017 | Chapman | B29C 66/532 |
| 9,616,594 | B2 | 4/2017 | Guzman et al. | |
| 9,643,395 | B2 | 5/2017 | Kline et al. | |
| 10,035,309 | B2 | 7/2018 | McCarville et al. | |
| 10,040,274 | B2 * | 8/2018 | Kisch | B32B 5/00 |
| 10,046,525 | B2 * | 8/2018 | Forston | B64C 3/182 |
| 10,105,942 | B2 | 10/2018 | Castorina et al. | |
| 10,864,687 | B2 | 12/2020 | McCarville et al. | |
| 10,967,586 | B2 | 4/2021 | Guzman et al. | |
| 11,446,883 | B2 * | 9/2022 | Stawski | B29D 99/0005 |
| 11,529,776 | B2 * | 12/2022 | Tran | B64C 3/182 |
| 11,655,018 | B2 * | 5/2023 | Stawski | B29C 70/44 244/119 |
| 2002/0031641 | A1 | 3/2002 | George et al. | |
| 2005/0023728 | A1 | 2/2005 | Benson et al. | |
| 2005/0048273 | A1 | 3/2005 | Ryan | |
| 2007/0116941 | A1 | 5/2007 | Brown et al. | |
| 2007/0175573 | A1 | 8/2007 | Fox et al. | |
| 2008/0053599 | A1 | 3/2008 | Aijima | |
| 2011/0048624 | A1 | 3/2011 | Nitsch | |
| 2012/0237736 | A1 | 9/2012 | Blot et al. | |
| 2013/0105072 | A1 | 5/2013 | Anderson et al. | |
| 2013/0149521 | A1 | 6/2013 | Nelson et al. | |
| 2014/0034236 | A1 | 2/2014 | Guzman et al. | |
| 2015/0283764 | A1 | 10/2015 | McCarville et al. | |
| 2017/0217110 | A1 | 8/2017 | Kline et al. | |
| 2017/0262152 | A1 | 9/2017 | Chapman et al. | |
| 2018/0093431 | A1 | 4/2018 | Forston et al. | |
| 2021/0023796 | A1 | 1/2021 | Stawski | |

FOREIGN PATENT DOCUMENTS

| | | | |
|---|---|---|---|
| JP | S4823154 | B1 | 7/1973 |
| JP | H01208147 | A | 8/1989 |
| JP | H04299110 | A | 10/1992 |
| JP | 2013530855 | A | 8/2013 |
| RU | 2415750 | C2 | 4/2011 |
| WO | WO2001062495 | A2 | 8/2001 |
| WO | WO2011001080 | A1 | 1/2011 |

OTHER PUBLICATIONS

Remi Blanc, Christian Germain, Jean-Pierre Da Costa, Pierre Baylou, Michel Cataldi. Fiber orientation measurements in composite materials. Composites Part A: Applied Science and Manufacturing, Elsevier, 2006, 37 (2), pp. 197-206.

* cited by examiner

COMPOSITE RADIUS FILLERS, ASSEMBLIES INCLUDING COMPOSITE RADIUS FILLERS, AND SYSTEMS AND METHODS OF FORMING THE SAME

FIELD

The present disclosure relates generally to composite radius fillers that fill void spaces within composite structures and more particularly to composite radius fillers which vary in mechanical properties.

BACKGROUND

Composite structures often include a laminate structure in which sheets of a composite material, such as a pre-impregnated (or prepreg) material, may be bent, wrapped, and/or otherwise extended between a first plane, or surface, and a second plane, or surface. The finite thickness and/or mechanical stiffness of the sheets of composite material result in a finite bend, or radius of curvature, in a transition region between the first surface and the second surface; and, in some geometries, this finite radius of curvature results in a void space, or cavity, between adjacent sheets of composite material.

This void space may be filled with, or otherwise occupied by, a filler material, such as a composite radius filler. The composite radius filler may be configured to provide mechanical support to the sheets of composite material that are proximal thereto and/or to decrease a potential for distortion of the sheets of composite material while the composite structure is curing. While the presence of the composite radius filler may provide a variety of benefits to the composite structure, differences between a geometry, cross-sectional shape, and/or material property of the composite radius filler when compared to a geometry, cross-sectional shape, and/or material property of the composite material that defines the void space may distort the composite structure and/or the composite radius filler during formation and/or curing of the composite structure. Thus, it may be desirable to closely match the shape of the composite radius filler to a shape, or a desired shape, of the void space. In addition, it also may be desirable to match the material properties of the composite radius filler to that of the sheets of composite material and/or the resultant composite structure.

Traditional composite radius fillers often utilize a single length of composite material or stack of material that do not allow for variation in mechanical properties along the composite radius filler. Accordingly, there is a need for composite radius fillers with variable mechanical properties and manufacturing for the composite radius fillers.

SUMMARY

Composite radius fillers and assemblies comprising composite radius fillers are disclosed. In some examples, a composite radius filler comprises a body having a longitudinal axis. In such examples, the body comprises a main-portion and an end-portion. The main-portion extends along the longitudinal axis and has a first stiffness. The body further comprises an end-portion that extends along the longitudinal axis, that is adjacent to the main-portion, that defines at least a portion of a terminal end of the body, and that has a second stiffness that differs from the first stiffness. In such examples, at least a first portion of an interface between the main-portion and the end-portion is at an angle relative to the longitudinal axis.

In further examples, an aircraft assembly comprises a first composite structure, a second composite structure, and a composite radius filler operatively positioned between the first composite structure and the second composite structure.

Methods for manufacturing composite radius fillers are also disclosed. In one example, a composite manufacturing method comprises constructing a composite radius filler.

DESCRIPTION

Composite radius fillers, assemblies comprising composite radius fillers, and methods for manufacturing composite radius fillers are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
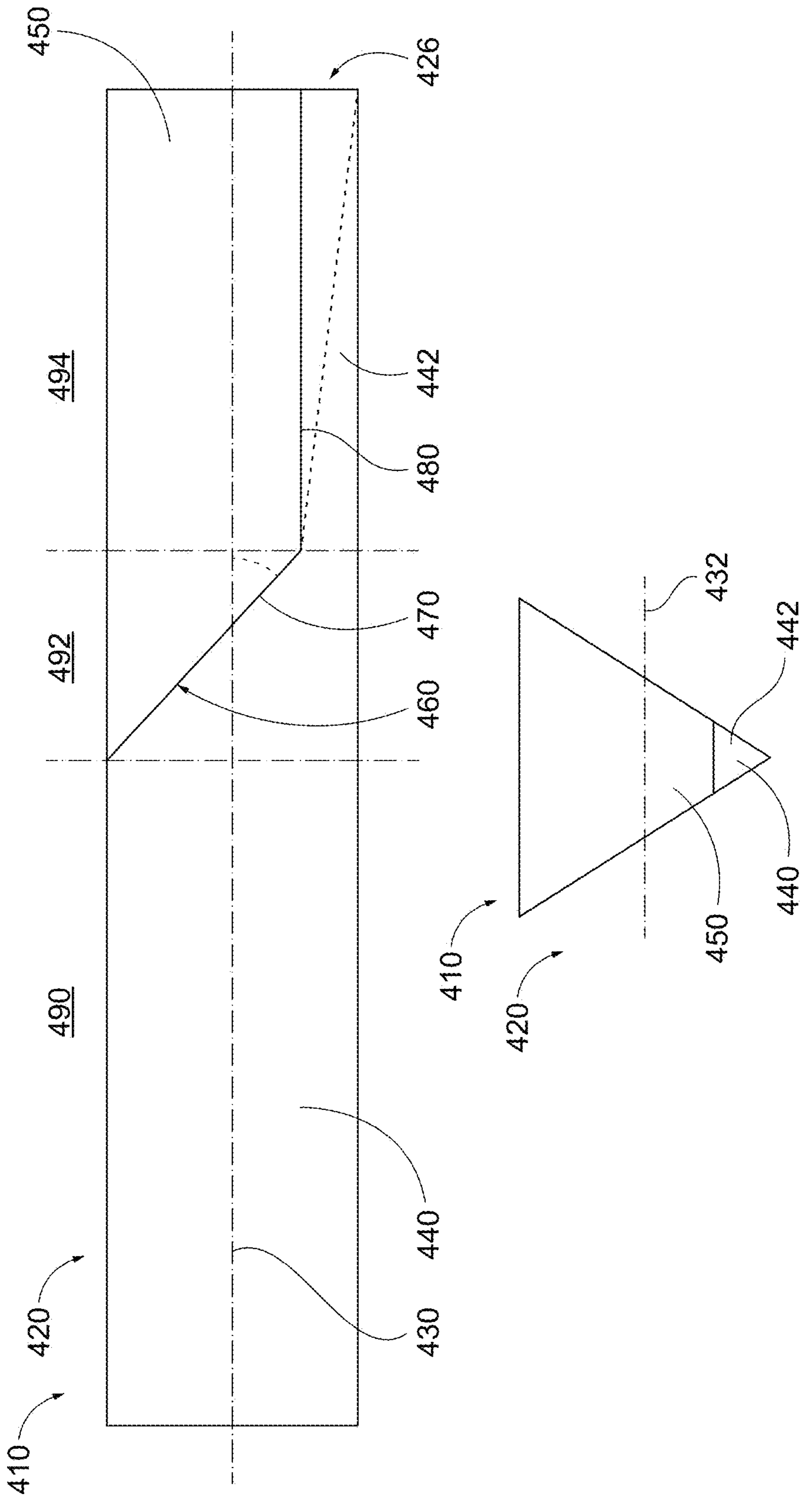
FIG. 1 is a schematic cross-sectional diagram representing an example of composite radius fillers.
Figure 2:
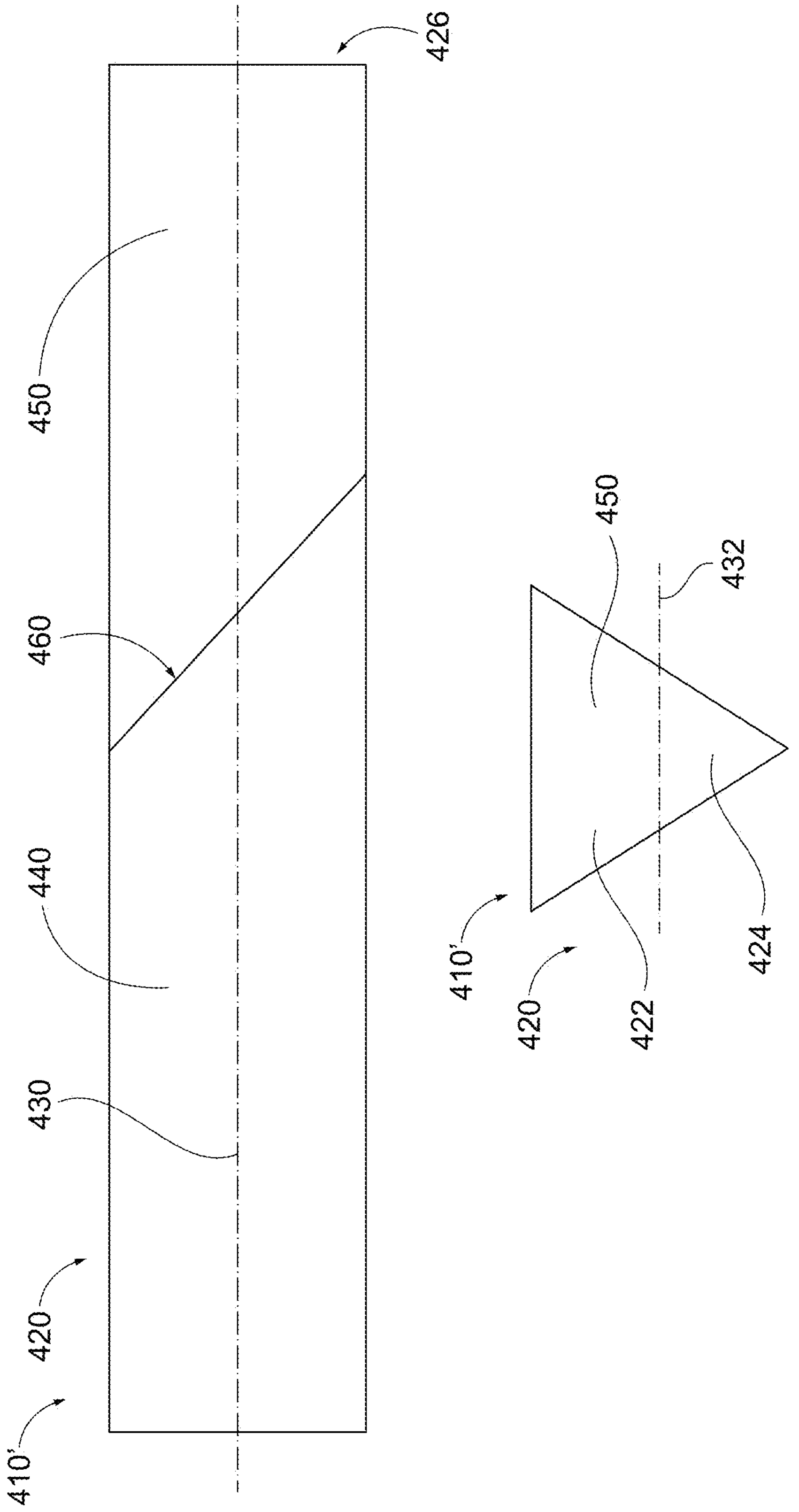
FIG. 2 is a schematic cross-sectional diagram representing an example of composite radius fillers.

As schematically illustrated in FIGS. 1 and 2, one example of a composite radius filler 410, 410' comprises a body 420 having a longitudinal axis 430. The body 420 comprises a main-portion 440 that extends along the longitudinal axis 430 and that has a first stiffness. The body 420 further comprises an end-portion 450 that extends along the longitudinal axis 430, that is adjacent to the main-portion 440, that defines at least a portion of a terminal end 426 of the body 420, and that has a second stiffness that differs from the first stiffness. In this example, at least a first portion 470 of an interface 460 between the main-portion 440 and the end-portion 450 is at an angle relative to the longitudinal axis 430.

The end-portion 450 may also be referred to as an adjacent portion 450 or an adjoining portion 450. Furthermore, end-portion 450 may have a greater length than the main-portion 440 and thus extend over half a length of body 420.

As discussed above, composite radius fillers are structural components which are frequently positioned within voids and between components. The arrangement and composition of composite radius fillers allow for mechanical properties of the composite radius fillers to vary along multiple directions. The variation in mechanical properties allows for composite radius fillers to meet the needs of specific locations within an assembly or system. For example, a composite radius filler with two or more different stiffness properties may be beneficial to a structure. In one example of a composite radius filler 410, 410', a main-portion 440 with a stiffness higher than a stiffness of an end-portion 450. Such an example may meet the needs of an application where a lower stiffness is advantageous for an end-portion. However, in other examples, the end-portion 450 has a stiffness higher than a stiffness of the main-portion 440.

An interface 460 is where a main-portion 440 and an end-portion 450 (adjacent portion 450) of a composite radius filler 410, 410' meet. Thus, the interface 460 is also where the mechanical properties of a composite radius filler 410, 410' transition from the mechanical properties of the main-portion 440 to the mechanical properties of the end-portion 450.

Mechanical properties of the main-portion 440 and the end-portion 450 (adjacent portion 450) are influenced by their respective composition. Some examples of composite radius fillers comprise fibers suspended in a matrix. One example of a material used for composite radius fillers is a carbon-fiber reinforced polymer which comprises carbon fibers suspended in a matrix of a binding polymer such as epoxy, polyester, vinyl ester, or nylon. Binding polymers for composite radius fillers can be thermoset or thermoplastic. Many other fibers are used in composite radius fillers such as graphite and glass fibers. Some examples of the main-portion 440 and the end-portion 450 may comprise fiber-reinforced composite materials.

Figure 3:
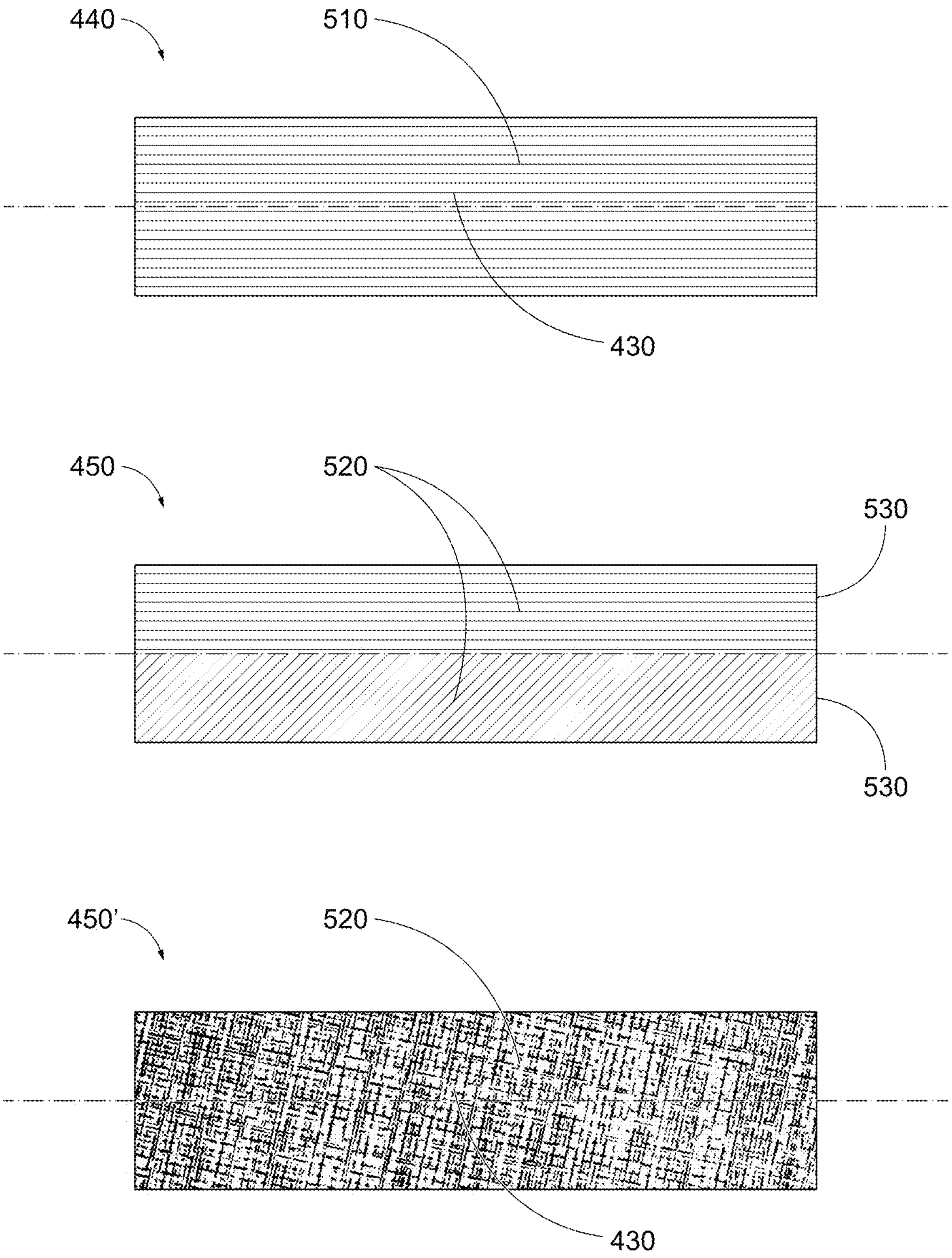
FIG. 3 is a schematic cross-sectional diagram representing examples of portions of composite radius fillers.

Fibers within composite radius fillers can have many different orientations. The orientation of fibers within a composite radius filler affects the stiffness of the material. FIG. 3 depicts several examples of fiber orientation. The example depicted in FIG. 3 is a main-portion 440 comprising main-portion fibers 510 that are all oriented in the same direction and are aligned with the longitudinal axis 430. In other words, the main-portion fibers 510 of this example are unidirectional.

Some example end-portions 450 also are comprised of fibers in a matrix. FIG. 3 depict examples of end-portions 450, 450' comprising fibers of differing orientations. Some examples of the end-portion 450 comprise end-portion fibers 520 with differing orientations from the main-portion fibers 510.

FIG. 3 depict examples of end-portions 450, 450' comprising at least a portion of the end-portion fibers 520 oriented in a different direction from the main-portion fibers 510. In other words, the end-portion 450 may comprise end-portion fibers 520 that are not all unidirectional. In the example of FIG. 3, the end-portion fibers 520 are aligned in at least two discrete orientations. The end-portion 450 comprises a laminate of a plurality of plies 530, and the end-portion fibers 520 of each respective ply 530 are unidirectional within the respective ply. In contrast to the example of end-portion 450, the end-portion 450' comprising end-portion fibers 520 that are randomly oriented.

Portions of composite radius fillers 410, 410' are produced using many methods such as extruding, pultruding, and laminating piles or layers. The method of production may affect the fiber orientation.

The interfaces 460 is a location where a main-portion 440 and an end-portion 450 meet. The interface 460 may affect manufacturability of the composite radius fillers 410, 410'. In examples of composite radius fillers comprising tapered portions, manufacturing difficulty may be reduced in comparison to examples of composite radius fillers without tapered portions. Some examples of end-portions of composite radius fillers are harder to fabricate, cut, and arrange within a void when compared to the main-portions. In some examples, the manufacturing difficulty may be due to different characteristics such as a main-portion with fibers all aligned in the same orientation in comparison to an end-portion comprising a laminate comprising plies of fibers in multiple orientations.

An example of an interface 460 is formed by positioning the main-portion 440 and the end-portion 450 in contact. In some examples, adhesive is arranged between the main-portion 440 and the end-portion 450. In other examples, adhesive is not used and the materials are bonded. Mechanical and thermal methods of bonding are used with composite materials. Adhesives such as epoxies, acrylics, and urethanes are also used with composite materials.

Interfaces 460 may have different arrangements, orientations, and portions. Some examples of the interface 460 comprise a first portion 470 positioned at an angle between 5-90 degrees relative to the longitudinal axis 430 of the body 420. In other examples, the first portion 470 of the interface 460 is substantially planar.

Further examples of the interface 460 comprise a second portion 480 at a second angle relative to the longitudinal axis 430. FIG. 1 depicts an example of composite radius filler 410 with a second portion 480. The second portion 480 may have different arrangements and orientations relative to the longitudinal axis 430 and the first portion 470. In some examples, the second portion 480 is parallel to the longitudinal axis 430. In some examples, the second portion 480 is substantially planar. In some examples, the second portion 480 extends to a terminal end 426 of the body 420.

Examples of composite radius fillers vary along a longitudinal direction of the body 420. For example, FIG. 1 depicts the body 420 having a first longitudinal region 490, a second longitudinal region 492, and a third longitudinal region 494. The first longitudinal region 490 is comprised of only the main-portion 440. The second longitudinal region 492 is arranged adjacent to the first longitudinal region 490 and comprises the first portion 470 of the interface 460. The third longitudinal region 494 is arranged adjacent to the second longitudinal region 492 opposite the first longitudinal region 490 and comprises the second portion 480 of the interface 460.

Interfaces 460 of composite radius fillers 410 may vary in the longitudinal direction as well. For example, FIG. 1 depicts a first angle of the first portion 470 of the interface 460 relative to the longitudinal axis 430 that is different from a second angle of the second portion 480 of the interface 460 relative to the longitudinal axis 430. In some examples, the second angle is smaller than the first angle.

Composite radius fillers 410 may vary in directions other than the longitudinal direction. For example, the body 420 of a composite radius filler 410, 410' may comprise a wide portion 422 with a greater width than a narrow portion 424 relative to a transverse axis 432 arranged perpendicular to the longitudinal axis 430. In such examples, the main-portion 440 extends along the narrow portion 424 for the entire length of the body 420.

Figure 7:
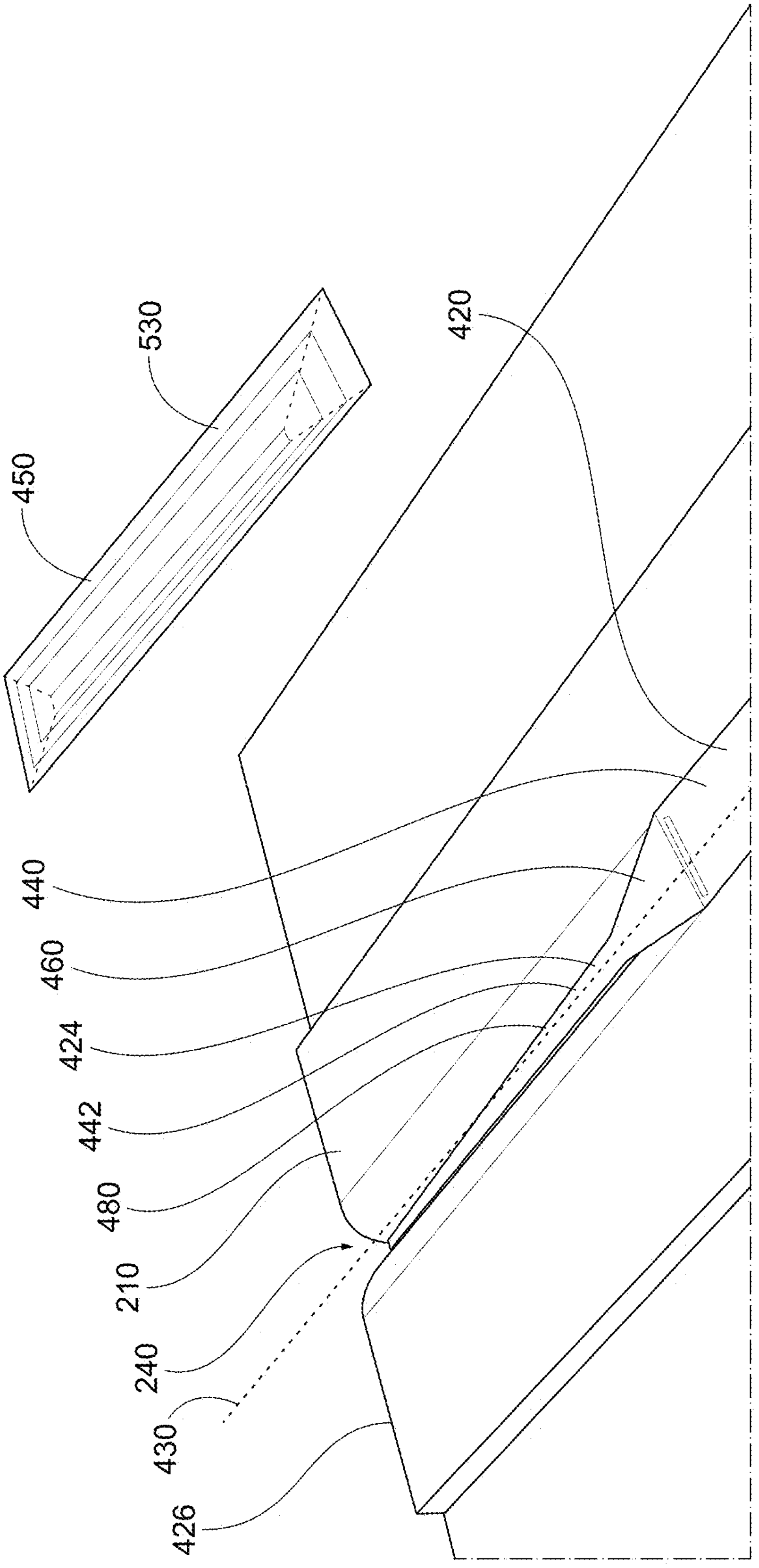
FIG. 7 is a perspective view of an example of a composite structure comprising a composite radius filler.
Figure 8:
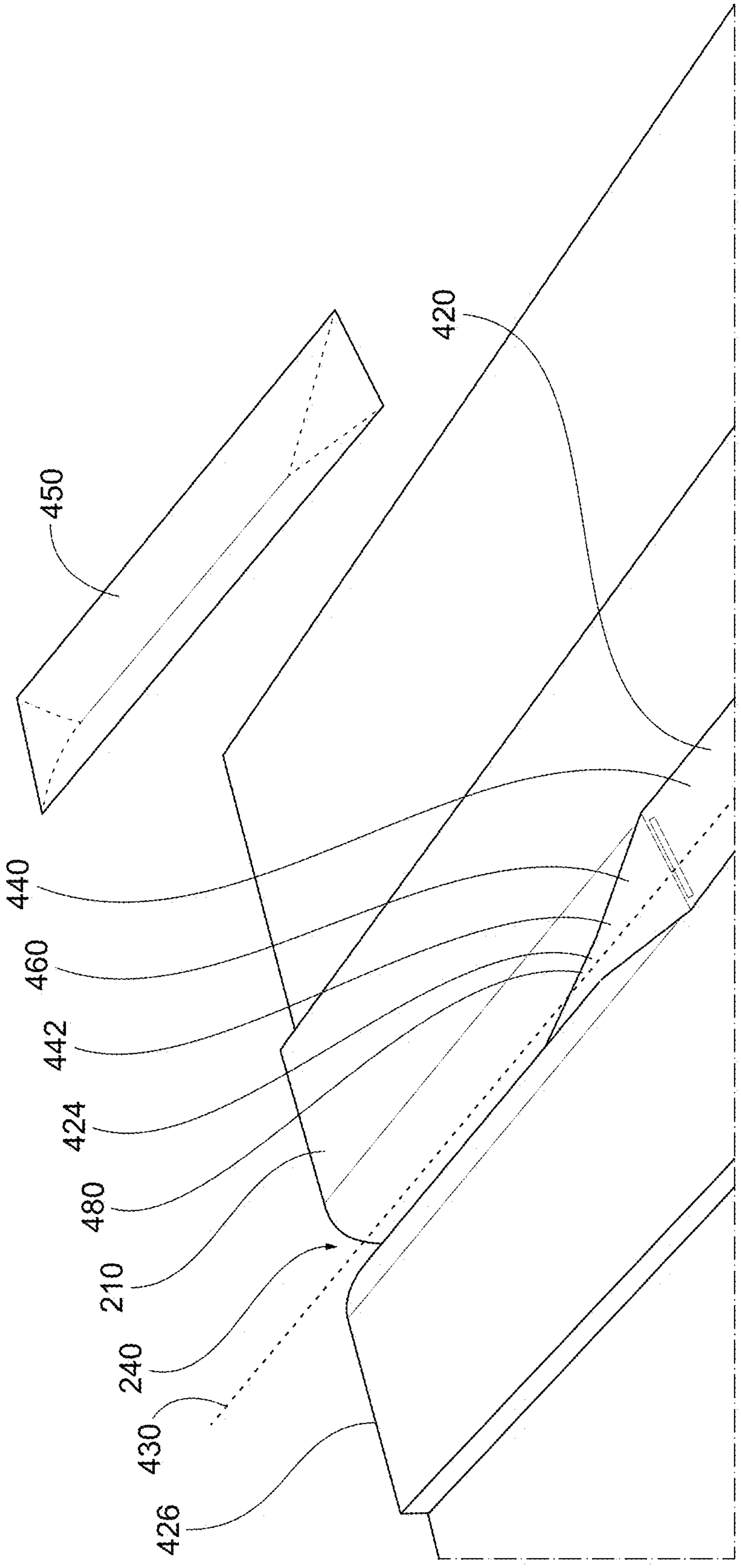
FIG. 8 is a perspective view of an example of a composite structure comprising a composite radius filler.

Examples of interfaces of composite radius fillers also vary in length of extension. In one example depicted in FIG. 1, the main-portion 440 extends along the entire length of the body 420. In another example depicted in FIG. 1, the interface 460 extends to the terminal end 426 of the body 420. In yet another example, and as depicted in FIG. 2, the interface 460 does not extend to the terminal end 426 of the body 420. In further examples, FIG. 7 illustrates the interface 460 extending to a terminal end of a first composite structure 210, and FIG. 8 illustrates the interface 460 terminating prior to the terminal end of the first composite structure 210.

Composite radius fillers 410, 410' may have different shapes and configurations. One example of a composite radius filler 410, 410' comprises a tapered portion 442 of the main-portion 440 which tapers in width as the tapered portion 442 extends towards the terminal end 426 of the body 420. Another example of the tapered portion 442 of the main-portion 440 tapers in height as the tapered portion 442 extends towards the terminal end 426 of the body 420, as can be seen in FIG. 1.

Figure 4:
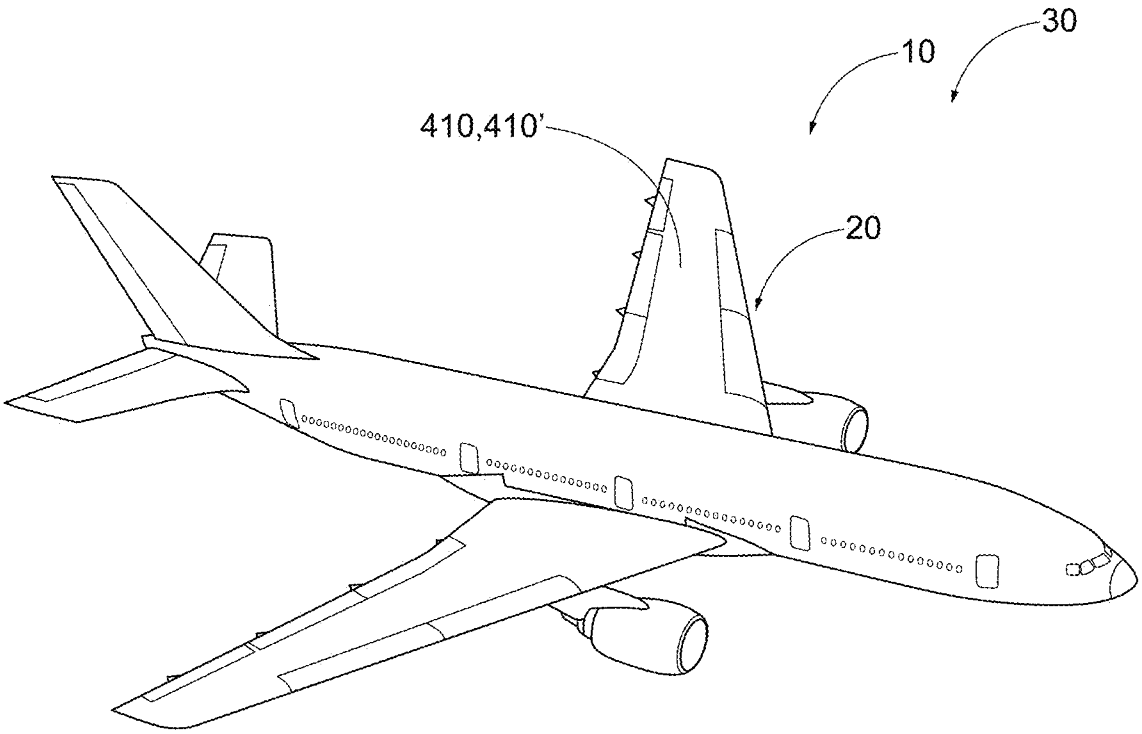
FIG. 4 is a perspective view of an example aircraft.

Composite radius fillers are often used in composite structures. Aircraft are an example of composite structures which utilize composite radius fillers. FIG. 4 depicts an example of an aircraft assembly 30 comprising an aircraft 10. The aircraft 10 comprises a wing 20, and a composite radius filler 410, 410' is arranged within the wing 20.

Figure 5:
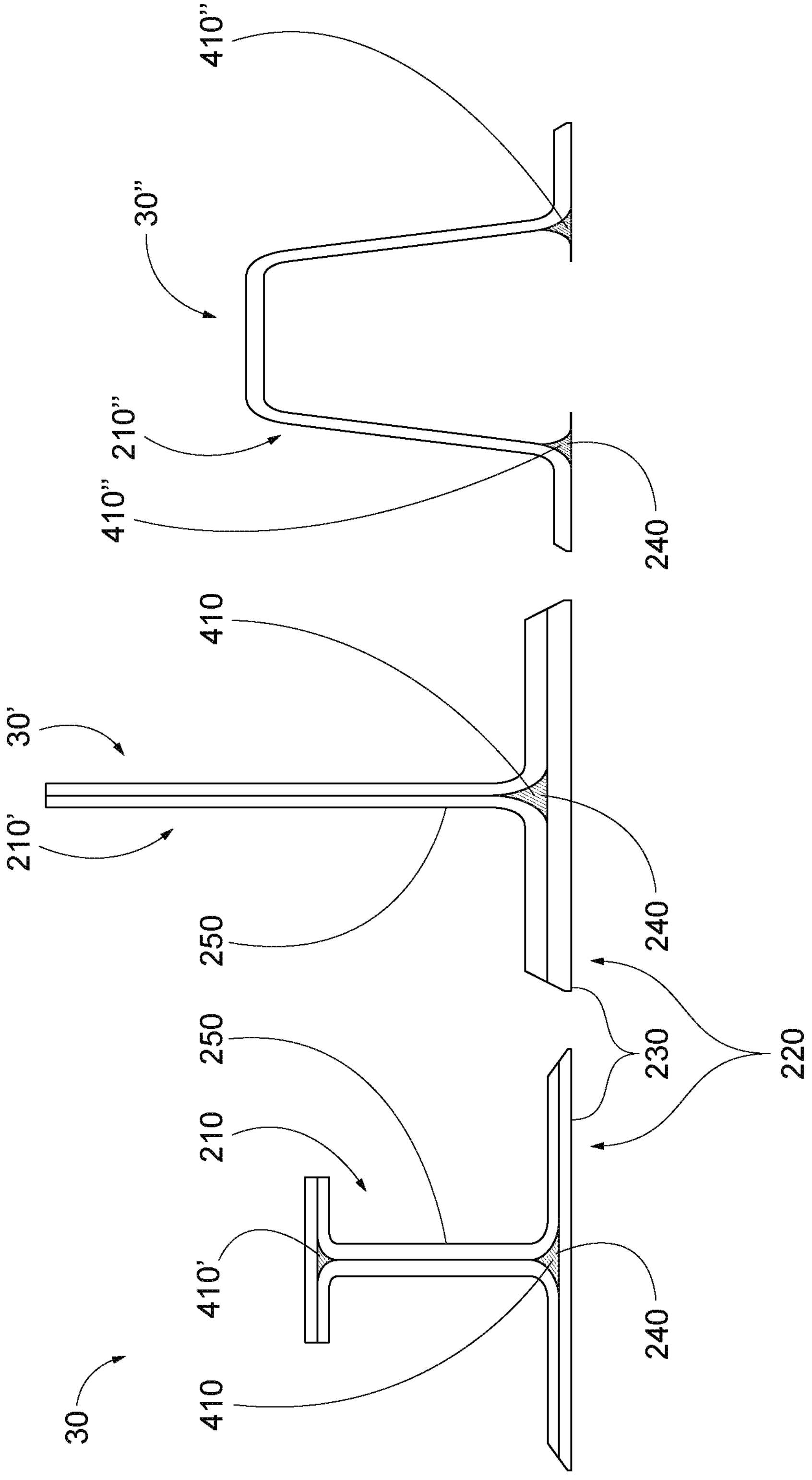
FIG. 5. is schematic cross-sectional diagram representing composite structures.

FIG. 5 depicts an example of an aircraft assembly 30, 30', 30" comprising a composite radius filler 410, 410', 410". The example aircraft assembly 30 comprises a first composite structure 210, a second composite structure 220, and a composite radius filler 410, 410' positioned between the first composite structure 210 and the second composite structure 220. Composite structures 210, 220 may form aircraft support structures within aircraft wings. For example, the first composite structure 210 may be a stringer or support and the second composite structure 220 may be a base or panel.

First composite structures 210, 210', 210" and second composite structures 220 may vary in configuration, as depicted in FIG. 5. In the example of FIG. 5, the first composite structure 210 comprises two voids 240, and the first composite structure 210' comprises one void. Similarly, first composite structures 210 may form different shapes such as the I-shape of first composite structure 210, the t-shape of first composite structure 210', and the u-shape or hat-shape of first composite structure 210".

In a further example depicted in FIG. 5, the second composite structure 220 comprises a panel 230, and the first composite structure 210 comprises a support 250 extending away from the panel 230. A composite radius filler 410, 410' is arranged within a void 240 formed between the panel 230 and the support 250. Some examples of first composite structures 210 include voids 240 for composite radius fillers 410, 410' on both ends, while other examples include voids on only one end. Furthermore, some examples of first composite structures 210 have an I-shaped cross-section, while other examples have a U-shaped cross-section. The first composite structures 210 forms part of a given void 240, as can be seen in the cross-sections depicted in FIG. 5.

Figure 6:
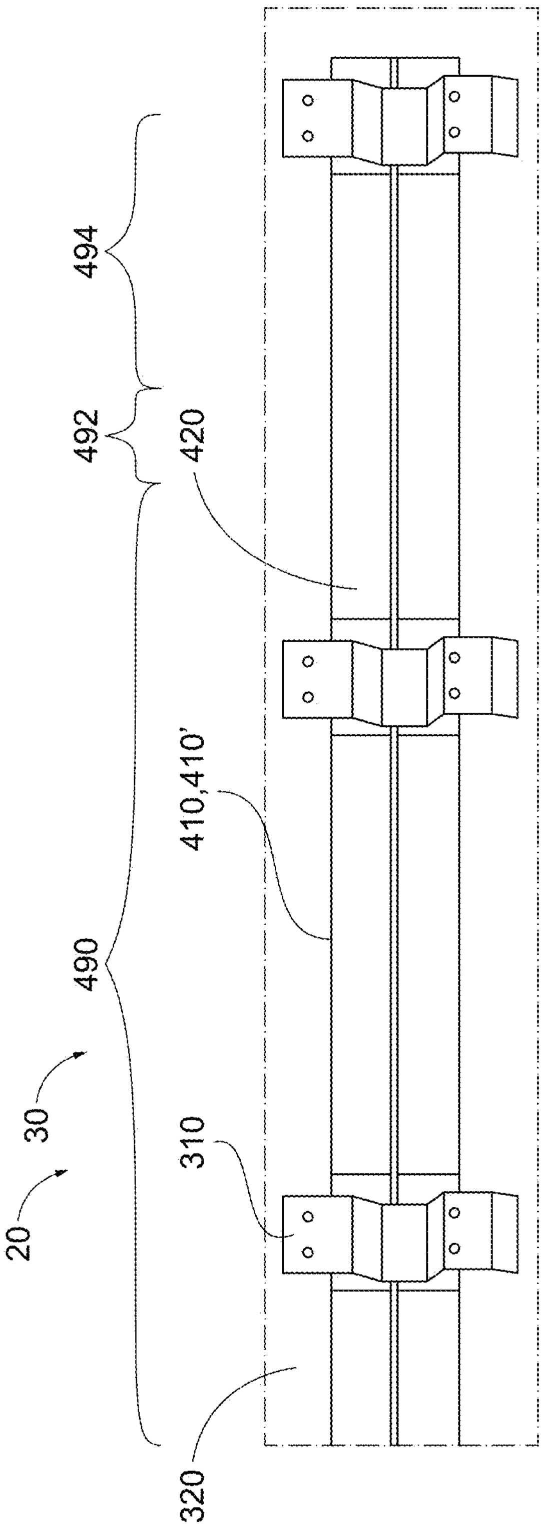
FIG. 6 is a perspective view of an example of a composite radius filler within an aircraft wing.

FIG. 6 illustrates an example of a composite radius filler 410, 410' within a wing 20 of an aircraft assembly 30. In the example of FIG. 6, the aircraft assembly 30 comprises a surface 320 and a rib 310 extending outward from the surface 320. The body 420 of the composite radius filler 410, 410' is operatively arranged in a void in the surface 320 and the rib 310 is arranged on the surface 320.

Positioning of the interface 460 will vary depending on a given application. A composite radius filler 410, 410' will be subjected to loads and stresses. For example, a composite radius filler 410, 410' will experience longitudinal loads oriented along the longitudinal axis 430 and vertical loads oriented perpendicular to longitudinal axis 430 and transverse axis 432. Loads and stresses within composite radius filler 410, 410' will thus vary based on factors such as the position within the composite radius filler 410, 410' itself and proximity to load bearing structures such as ribs.

In the example of FIG. 6, the interface 460 is positioned at a first position and the rib 310 is positioned at a second position, and wherein a first load and/or stress at the first position is less than a second load and/or stress at the second position. Some examples of ribs 310 transfer forces within a structure. Thus, in some examples, some loads and/or stresses in a composite radius filler 410, 410' is higher near a rib 310. Arranging a composite radius filler 410, 410' such that the interface 460 is positioned away from areas of higher load and/or stress may improve the mechanical properties of the structures by aligning areas of high load and/or stress with materials of high strength.

Figure 9:
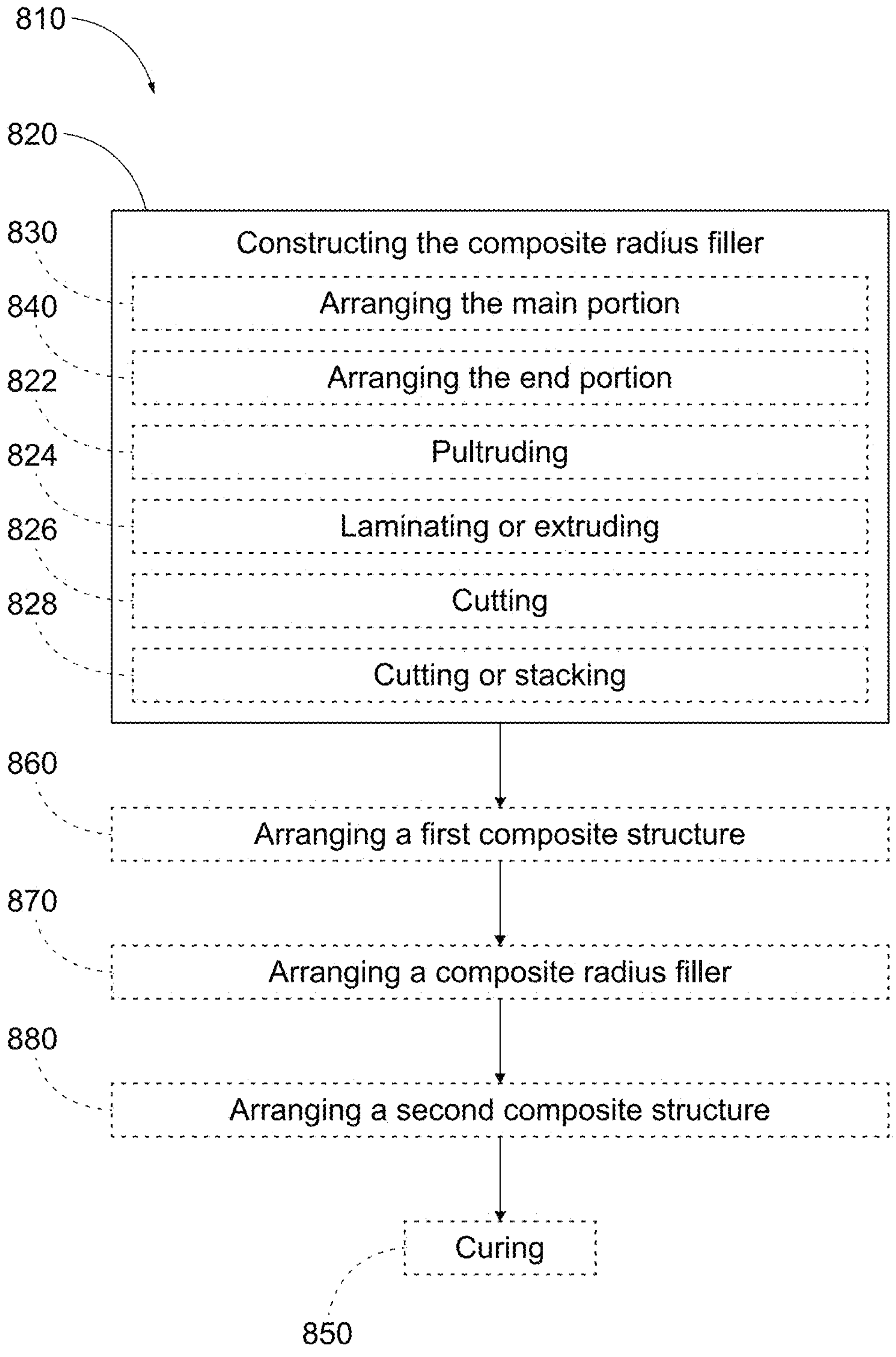
FIG. 9 is a flowchart schematically representing methods manufacturing composite radius fillers.

FIG. 9 schematically provides a flowchart that represents illustrative, non-exclusive examples of methods according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

As illustrated in FIG. 9, methods 810 of composite manufacturing comprise constructing 820 a composite radius filler 410, 410'. As also schematically illustrated in dashed lines in FIG. 9, the constructing 820 may further include arranging 830 a main-portion 440 along a longitudinal axis 430 of a body 420 and arranging 840 an end-portion 450 along the longitudinal axis 430 of the body 420 adjacent the main-portion 440. FIGS. 7 and 8 each show the main-portion 440 arranged along the longitudinal axis 430 and the end-portion 450 to be arranged along the longitudinal axis 430.

Methods may further include forming portions of the composite radius filler. As schematically illustrated in dashed lines in FIG. 9, an example of constructing 820 the composite radius filler 410, 410' includes pultruding 822 the main-portion 440. In another example, the constructing 820 the composite radius filler 410, 410' comprises laminating 824 the end-portion 450 from a plurality of plies 530. In a still further example, the constructing 820 the composite radius filler 410, 410' comprises extruding 824 the end-portion 450. The methods of forming portions of the composite radius filler depend on the composition of the portion to be formed. For example, the example of the end-portion 450 of FIG. 3 is formed by laminating whereas the example of the end-portion 450' is formed by extruding.

As also schematically illustrated in dashed lines in FIG. 9, the constructing 820 the composite radius filler 410, 410' also may include cutting 826 the main-portion 440 and cutting 828 the end-portion 450. Portions of composite radius fillers may be formed through many processes such as pultruding, extruding, laminating, cutting, and stacking plies. In the example of FIG. 7, the end-portion 450 has a laminated structure and the constructing 820 the composite radius filler 410, 410' comprises cutting 826 the main-portion 440 and stacking 828 plies 530 to form the end-portion 450. In another example, plies 530 are stacked 828 to form the end-portion 450 and then the end-portion 450 is cut 828. The example of FIG. 7 further depicts the plies 530 of end-portion 450 being arranged on tapered portion 442 of main-portion 440 within void 240.

As discussed above, composite fillers are often used to fill a radius or void within a material. As also schematically illustrated in dashed lines in FIG. 9, methods 810 may further include arranging 860 a first composite structure 210 comprising a void 240. Methods 810 further comprise arranging 870 the composite radius filler 410, 410' within the void 240 of the first composite structure 210 and arranging 880 a second composite structure 220 adjacent to the first composite and the composite radius filler 410, 410'. FIG. 5 depicts an example of a first composite structure 210 comprising a void 240. FIG. 2 depicts a composite radius filler 410, 410' within a void 240 and a second composite structure 220 arranged adjacent to the first composite and the composite radius filler 410, 410'.

In the examples of FIGS. 7 and 8, the void 240 comprises a narrow end and wherein the narrow portion 424 of the body 420 is arranged within the narrow end of the void. An example of a narrow portion 424 of the body 420 is depicted in FIG. 2.

As also schematically illustrated in dashed lines in FIG. 9, methods 810 also may include curing 850 the first composite structure 210, the second composite structure 220, and the composite radius filler 410, 410', after the arranging 880 the second composite structure 220. Curing is often used in composite manufacturing to toughen and harden materials.

FIG. 8 depicts a further example where the main-portion 440 does not extend to a terminal end 426 of the first composite structure 210. Both FIGS. 7 and 8 depict examples where an interface 460 is formed. In the examples of FIGS. 7 and 8, the constructing 820 the composite radius filler 410, 410' comprises aligning a face of main-portion 440 with a face of the end-portion 450 to form the interface 460.

FIGS. 7 and 8 further depict the interface 460 during the composite manufacturing method 810. In FIG. 7, the second portion 480 of the interface 460 extends to a terminal end 426 of the first composite structure 210, and thus, the end-portion 450 will be arranged on the second portion 480 of the interface 460. In contrast, FIG. 8 depicts a second portion 480 of the interface 460 which terminates prior to the terminal end of the first composite structure 210, and thus, the end-portion 450 will fill the void 240.

Illustrative, non-exclusive examples of inventive subject matter according to the present disclosure are described in the following enumerated paragraphs:

A. A composite radius filler (410, 410'), comprising:

a body (420) having a longitudinal axis (430), wherein the body (420) comprises:

a main-portion (440) that extends along the longitudinal axis (430) and that has a first stiffness; and an end-portion (450) that extends along the longitudinal axis (430), that is adjacent to the main-portion (440), that defines at least a portion of a terminal end (426) of the body (420), and that has a second stiffness that differs from the first stiffness;

wherein at least a first portion (470) of an interface (460) between the main-portion (440) and the end-portion (450) is at an angle relative to the longitudinal axis (430).

A1. The composite radius filler (410, 410') of paragraph A, wherein the main-portion (440) and the end-portion (450) comprise fiber-reinforced composite materials.

A1.1. The composite radius filler (410, 410') of paragraph A1, wherein the main-portion (440) comprises main-portion fibers (510), and wherein all of the main-portion fibers (510) are unidirectional.

A1.1.1. The composite radius filler (410, 410') of paragraph A1.1, wherein the main-portion fibers (510) are aligned with the longitudinal axis (430).

A1.2. The composite radius filler (410, 410') of any of paragraphs A-A1.1.1, wherein the end-portion (450) comprises end-portion fibers (520) that are not all unidirectional.

A1.2.1. The composite radius filler (410, 410') of paragraph A1.2, wherein the end-portion fibers (520) are randomly oriented.

A1.2.2. The composite radius filler (410, 410') of paragraph A.1.2, wherein the end-portion fibers (520) are aligned in at least two discrete orientations.

A1.2.3. The composite radius filler (410, 410') of any of paragraphs A1.2-A1.2.2, wherein the end-portion (450) comprises a laminate of a plurality of plies (530), wherein the end-portion fibers (520) of each ply of the plurality of plies (530) are unidirectional.

A2. The composite radius filler (410, 410') of any of paragraphs A-A1.2.3, wherein a tapered portion (442) of the main-portion (440) tapers in width as the tapered portion (442) extends towards the terminal end (426) of the body (420).

A2.1 The composite radius filler (410, 410') of paragraph A2, wherein the tapered portion (442) of the main-portion (440) tapers in height as the tapered portion (442) extends towards the terminal end (426) of the body (420).

A3. The composite radius filler (410, 410') of any of paragraphs A-A2, wherein the first portion (470) of the interface (460) is positioned at an angle between 5-90 degrees relative to the longitudinal axis (430) of the body (420).

A4. The composite radius filler (410, 410') of any of paragraphs A-A3, wherein the first portion (470) of the interface (460) is substantially planar.

A5. The composite radius filler (410, 410') of any of paragraphs A-A4, wherein the interface (460) comprises a second portion (480), and wherein the second portion (480) of the interface (460) is at a second angle relative to the longitudinal axis (430).

A5.1. The composite radius filler (410, 410') of paragraph A5, wherein the second portion (480) of the interface (460) is parallel the longitudinal axis (430).

A5.2. The composite radius filler (410, 410') of any of paragraphs A-A5.1, wherein the second portion (480) of the interface (460) is substantially planar.

A5.3. The composite radius filler (410, 410') of any of paragraphs A-A5.2, wherein the second portion (480) extends to the terminal end (426) of the body (420).

A5.4. The composite radius filler (410, 410') of any of paragraphs A5-A5.3, wherein the body (420) comprises:

a first longitudinal region (490) comprised of only the main-portion (440);

a second longitudinal region (492) adjacent to the first longitudinal region (490) and that comprises the first portion (470) of the interface (460); and a third longitudinal region (494) adjacent to the second longitudinal region (492) and opposite the first longitudinal region (490) and that comprises the second portion (480) of the interface (460); and wherein a first angle of the first portion (470) of the interface (460) relative to the longitudinal axis (430) is different from a second angle of the second portion (480) of the interface (460) relative to the longitudinal axis (430).

A5.4.1. The composite radius filler (410, 410') of paragraph A5.4, wherein the second angle is smaller than the first angle.

A6. The composite radius filler (410, 410') of any of paragraphs A-A5.4.1, wherein the body (420) comprises a wide portion (422) with a greater width than a narrow portion (424), wherein the width is relative to a transverse axis (432) arranged perpendicular to the longitudinal axis (430), and wherein the main-portion (440) extends along the narrow portion (424) for an entire length of the body (420).

A7. The composite radius filler (410, 410') of any of paragraphs A-A6, wherein the main-portion (440) extends along an/the entire length of the body (420).

A8. The composite radius filler (410, 410') of paragraph A, wherein the interface (460) extends to the terminal end (426) of the body (420).

A9. The composite radius filler (410, 410') of any of paragraphs A-A6, wherein the interface (460) does not extend to the terminal end (426) of the body (420).

B. An aircraft assembly (30), comprising:

a first composite structure (210);

a second composite structure (220); and the composite radius filler (410, 410') of any of paragraphs A-A9 operatively positioned between the first composite structure (210) and the second composite structure (220).

B1. The aircraft assembly (30) of paragraph B, wherein the second composite structure (220) comprises a panel (230), wherein the first composite structure (210) comprises a support (250) extending away from the panel (230), and wherein the body (420) of the composite radius filler (410, 410') is arranged within a void (240) formed between the panel (230) and the support (250).

B2. The aircraft assembly (30) of any of paragraphs B-B1, wherein the aircraft assembly (30) comprises an aircraft (10), wherein the aircraft (10) comprises a wing (20), and wherein the composite radius filler (410, 410') is arranged within the wing (20).

B3. The aircraft assembly (30) of any of paragraphs B-B2, wherein the aircraft assembly (30) comprises a surface (320) and a rib (310) extending outward from the surface (320), wherein the body (420) of the composite radius filler (410, 410') is operatively arranged between the surface (320) and the rib (310), and wherein the interface (460) is positioned at a first position and the rib (310) is positioned at a second position, and wherein a first load and/or stress at the first position is less than a second load and/or stress at the second position).

C. A composite manufacturing method (810), comprising: constructing (820) the composite radius filler (410, 410') of any of paragraphs A-A9.

C1. The composite manufacturing method (810) of paragraph C, wherein the constructing (820) the composite radius filler (410, 410') comprises:

arranging (830) the main-portion (440) along the longitudinal axis (430) of the body (420); and arranging (840) the end-portion (450) along the longitudinal axis (430) of the body (420) and adjacent the main-portion (440).

C2. The composite manufacturing method (810) of any of paragraphs C-C1, wherein the constructing (820) the composite radius filler (410, 410') comprises pultruding (822) the main-portion (440).

C3. The composite manufacturing method (810) of any of paragraphs C-C2, wherein the constructing (820) the composite radius filler (410, 410') comprises laminating (824) the end-portion (450) from a/the plurality of plies (530).

C4. The composite manufacturing method (810) of any of paragraphs C-C2, wherein constructing (820) the composite radius filler (410, 410') comprises extruding (824) the end-portion (450).

C5. The composite manufacturing method (810) of any of paragraphs C-C4, wherein composite manufacturing method (810) comprises:

arranging (860) a first composite structure (210), wherein the first composite structure (210) comprises a void (240);

arranging (870) the composite radius filler (410, 410') within the void (240) of the first composite structure (210);

arranging (880) a second composite structure (220) adjacent to the first composite and the composite radius filler (410, 410').

C5.1 The composite manufacturing method (810) of paragraph C5, wherein the void (240) comprises a narrow end and wherein a/the narrow portion (424) of the body (420) is arranged within the narrow end of the void (240).

C6. The composite manufacturing method (810) of any of paragraphs C-C5.1, further comprising curing (850) the first composite structure (210), the second composite structure (220), and the composite radius filler (410, 410') after the arranging of the second composite structure (220).

C7. The composite manufacturing method (810) of any of paragraphs C-C6, wherein the constructing (820) the composite radius filler (410, 410') comprises:

cutting (826) the main-portion (440); and cutting (828) the end-portion (450).

C8. The composite manufacturing method (810) of any of paragraphs C-C6, wherein constructing (820) the composite radius filler (410, 410') comprises:

cutting (826) the main-portion (440); and stacking (828) plies (530) to form the end-portion (450).

C9. The composite manufacturing method (810) of any of paragraphs C-C6, wherein constructing (820) the composite radius filler (410, 410') comprises:

aligning a face of the main-portion (440) with a face of the end-portion (450) to form the interface (460).

D. The use of the composite radius filler (410, 410') of paragraphs A-A9 to fill a void (240) in a structure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and sub-combinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, "at least substantially," when modifying a degree or relationship, may include not only the recited "substantial" degree or relationship, but also the full extent of the recited degree or relationship. For example, substantially may include a margin of 25% greater and less than a stated value or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length. As another example, a first component being substantially planar includes components with 25% or less deviation from a plane.

The invention claimed is:

1. A composite radius filler, comprising:
- a body having a longitudinal axis, wherein the body comprises:
  - a main-portion that extends along the longitudinal axis and that has a first stiffness, wherein the main-portion comprises main-portion fibers, wherein all of the main-portion fibers are unidirectional; and
  - an end-portion that extends along the longitudinal axis, that is adjacent to the main-portion, that defines at least a portion of a terminal end of the body, and that has a second stiffness that differs from the first stiffness, wherein the end-portion comprises end-portion fibers that are not all unidirectional;
  - an interface between the main-portion and the end-portion, wherein the interface comprises a first portion and a second portion, wherein the first portion of the interface is arranged at a first angle relative to the longitudinal axis, wherein the second portion of the interface is arranged at a second angle relative to the longitudinal axis, wherein the second angle is different from the first angle, wherein the second portion of the interface extends to the terminal end of the body,
  - a first longitudinal region comprised of only the main-portion;
  - a second longitudinal region arranged adjacent to the first longitudinal region, and comprising the first portion of the interface; and
  - a third longitudinal region arranged adjacent to the second longitudinal region and opposite the first longitudinal region, wherein the third longitudinal region comprises the second portion of the interface.

2. The composite radius filler of claim 1, wherein the end-portion fibers are randomly oriented.

3. The composite radius filler of claim 1, wherein the end-portion is arranged on a tapered portion of the main-portion, and wherein the tapered portion tapers in width and in height as the tapered portion extends towards the terminal end of the body.

4. The composite radius filler of claim 1, wherein the first portion of the interface is positioned at an angle between 5-90 degrees relative to the longitudinal axis of the body.

5. The composite radius filler of claim 1, wherein the second portion of the interface extends to the terminal end of the body.

6. The composite radius filler of claim 1, wherein the interface extends to the terminal end of the body.

7. An aircraft assembly, comprising:
- a first composite structure;
- a second composite structure; and
- a composite radius filler comprising:
  - a body having a longitudinal axis, wherein the body comprises:
    - a main-portion that extends along the longitudinal axis and that has a first stiffness, wherein the main-portion comprises main-portion fibers, wherein all of the main-portion fibers are unidirectional; and
    - an end-portion that extends along the longitudinal axis, that is adjacent to the main-portion, that defines at least a portion of a terminal end of the body, and that has a second stiffness that differs from the first stiffness, wherein the end-portion comprises end-portion fibers that are not all unidirectional;
    - an interface between the main-portion and the end-portion, wherein the interface comprises a first portion and a second portion, wherein the first portion of the interface is arranged at a first angle relative to the longitudinal axis, wherein the second portion of the interface is arranged at a second angle relative to the longitudinal axis, wherein the second angle is different from the first angle, wherein the second portion of the interface extends to the terminal end of the body;
    - a first longitudinal region comprised of only the main-portion;
    - a second longitudinal region arranged adjacent to the first longitudinal region, and comprising the first portion of the interface; and
    - a third longitudinal region arranged adjacent to the second longitudinal region and opposite the first longitudinal region, wherein the third longitudinal region comprises the second portion of the interface; and
- wherein the composite radius filler is operatively positioned between the first composite structure and the second composite structure.

8. The aircraft assembly of claim 7, wherein the first composite structure comprises a support extending away from the second composite structure, and wherein the body of the composite radius filler is arranged within a void formed between the second composite structure and the support.

9. The aircraft assembly of claim 8, wherein the void comprises a narrow end and the body comprises a wide portion with a width greater than a narrow portion, wherein the width is relative to a transverse axis arranged perpendicular to the longitudinal axis, wherein the main-portion extends along the narrow portion for an entire length of the body, and wherein the narrow portion of the body is arranged within the narrow end of the void.

10. The aircraft assembly of claim 7, wherein the aircraft assembly comprises an aircraft, wherein the aircraft comprises a wing, and wherein the composite radius filler is arranged within the wing.

11. The aircraft assembly of claim 7, wherein the aircraft assembly comprises a surface and a rib extending away from the surface, wherein the body of the composite radius filler is operatively arranged between the surface and the rib, and wherein the interface is positioned at a first position and the rib is positioned at a second position, and wherein a first load and/or stress at the first position is less than a second load and/or stress at the second position.

12. The aircraft assembly of claim 7, wherein the end-portion comprises end-portion fibers that are randomly oriented.

13. A composite manufacturing method, comprising:

constructing the composite radius filler of claim 1.

14. The composite manufacturing method of claim 13, wherein the constructing the composite radius filler comprises:

arranging the main-portion along the longitudinal axis of the body; and arranging the end-portion along the longitudinal axis of the body and adjacent to the main-portion.

15. The composite manufacturing method of claim 13, wherein the composite manufacturing method comprises:

arranging a first composite structure, wherein the first composite structure comprises a void;

arranging the composite radius filler within the void of the first composite structure;

arranging a second composite structure adjacent to the first composite structure and the composite radius filler.

16. The composite manufacturing method of claim 15, wherein the void comprises a narrow end, and wherein a narrow portion of the body is arranged within the narrow end of the void.

17. The composite manufacturing method of claim 15, further comprising curing the first composite structure, the second composite structure, and the composite radius filler, after the arranging of the second composite structure.

18. The composite manufacturing method of claim 13, wherein the constructing the composite radius filler comprises:

cutting the main-portion; and cutting the end-portion.

19. The composite manufacturing method of claim 13, wherein constructing the composite radius filler comprises:

cutting the main-portion; and stacking plies to form the end-portion.

20. The composite manufacturing method of claim 13, wherein constructing the composite radius filler comprises:

aligning a face of the main-portion with a face of the end-portion to form the interface.

* * * * *